Patented Sept. 22, 1925.

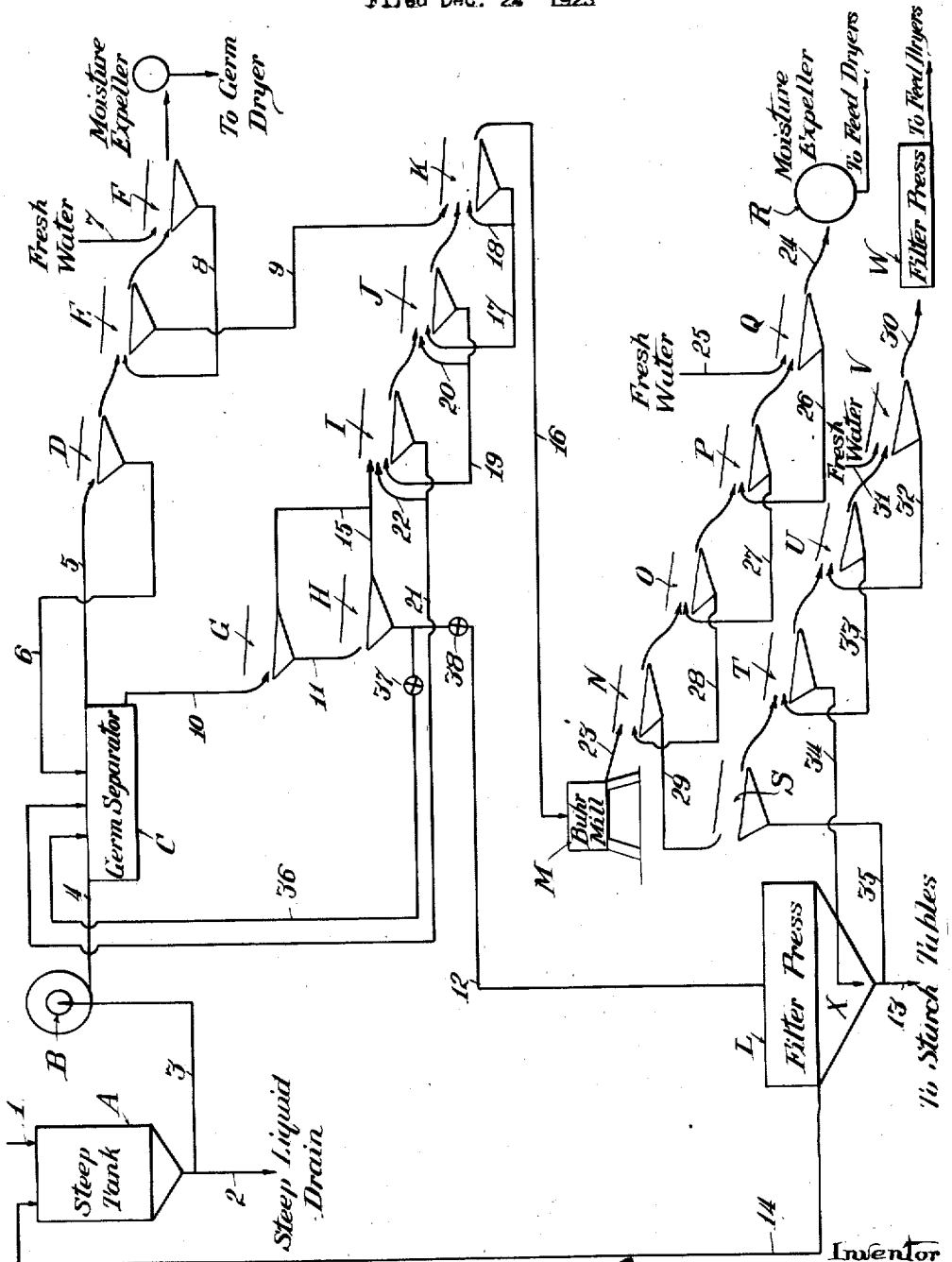

1,554,301

UNITED STATES PATENT OFFICE.

ROBERT F. SHERMAN, OF PEKIN, ILLINOIS.

MANUFACTURE OF STARCH.

Application filed December 24, 1923. Serial No. 682,516.

*To all whom it may concern:*

Be it known that I, ROBERT F. SHERMAN, a citizen of the United States, residing at Pekin, in the county of Tazewell and State of Illinois, have invented certain new and useful Improvements in the Manufacture of Starch, of which the following is a specification.

My invention relates to the manufacture of starch from corn, and one of the principal objects of the invention is to increase the amount of soluble substances in the corn recovered during the process of manufacturing and refining the starch by subjecting the soluble bearing material to certain operations to be hereinafter described.

A further object is to utilize the fresh water introduced into the process in a manner to be most effective for producing a thorough and complete separation of the starch from the other ingredients of the corn.

A further object is to eliminate, partially or wholly, the necessity of re-tabling the starch, by removing the residual solubles contained in the grain after steeping before the starch is tabled. The re-tabling operation is performed primarily for the purpose of removing solubles. It is an expensive operation, the cost of labor, apparatus and up-keep of apparatus being relatively high. Moreover, the solubles eliminated by tabling are lost as the wash liquor contains so small a percentage of these substances in proportion to its volume that its concentration is not economically practical. In accordance with my improved process the solubles are removed during certain operations preceding tabling and in such manner as makes their recovery feasible.

A further object is to remove the major part of solubles in starch previous to tabling so that if the starch is subsequently flushed from tables and filtered the filtered starch will be freer from solubles than at present, and if in addition this starch is washed while filtering, a starch is obtained having a much less soluble content than at present.

The annexed drawing shows diagrammatically an apparatus suitable for carrying out the process of this invention. Diagrammatic representation of this apparatus is sufficient as the various instrumentalities are all of familiar construction. In practice, for example, each unit shown singly in the drawing will ordinarily consist of a number of like instrumentalities arranged in series or in parallel such as tanks, mills, separators, or other devices as the case may be.

Referring to the drawing, A represents the steep tank in which the whole grain is steeped in the usual manner. Acidified water is supplied to the tank through pipe 1 and the steep liquor is drawn off through pipe 2. B is a mill for cracking the steeped grain, the grain being moved to the mill by conveyor 3, and C is a germ separator to which the cracked material is delivered by conveyor 4 from which the germs are floated off and in which the cracked corn settles. The germs pass by conveyor 5 to a reel or other separating device D, the starch liquor from which is returned to the germ separator through pipe 6, according to the usual practice. The germs from the reel D are then discharged into one or more reels, for example, reels E and F in succession and from reel F to a moisture expeller and then to a germ drier, as customary. The reel F receives fresh water or other suitable washing liquid through pipe 7 which washes the germs therein and which then passes to reel E by pipe 8, thus constituting a countercurrent washing system. From reel E the light starch liquor passes by pipe 9 to reel K hereinafter described. The starch liquor and cracked corn delivered from the separator C through pipe 10 are subjected to a reeling or other separating treatment to remove the starch liquor containing loose starch particles from the cracked corn. This may be done by passing the material through a coarse mesh reel G and the starch liquor from G through a fine mesh reel H, the starch liquor passing from reel G to reel H by pipe 11. The tailings from these reels will contain a certain quantity of soluble substances which are removed therefrom as hereinafter described. The bulk of the starch liquor from reel H instead of being sent directly to the starch tables, in accordance with former practice, is subjected to a separating operation for removing from the starch the bulk of the water and therewith most of the solubles. For example, the surplus starch liquir not returned to the germ separator may be run through pipe 12 and filter pressed in the press L, which may be of any desired type. The starch from the press, which is in a solid state but moist, is then diluted and run through pipe 13 to the starch tables (not shown). The starch liquor used for diluting the starch from the filter press is a light liquor relatively free from solubles, derived from the washing of the tailings in reel T, as will be hereinafter described. The filtrate from the press L, which will be relatively high in solubles, is returned to the steep A through pipe 14.

The tailings from reels G and H pass through pipes 15 to one or more reels or other washing devices. Three of these reels are shown, being designated I, J, and K. The tailings from I go to J and those from J to K. The tailings from K are moved by conveyor 16 to the buhr mill M. Reel K receives light starch liquor from pipe 9 as previously described which washes the material therein, the bulk of starch liquor passing through reel K passes to reel J by pipe 17, however, a portion is returned to reel K through pipe 18 constituting a washing cycle which is desirable in order that material entering reel K may be of proper consistency. This washing operation is repeated in reel J, the bulk of the starch liquor passing to reel I by pipe 19 a part returning to reel J by pipe 20. The washing operation is again repeated in reel I the bulk of the starch liquor, which now contains practically all of the soluble matter contained in the cracked corn from reels G and H, returns to separator C by pipe 21, a portion returning to reel I by pipe 22. By this method of counter-current washing in reels I, J and K the cracked corn discharged from reel K is practically free from solubles. It is important that the specific gravity of the starch liquor in germ separator C be maintained within narrow limits in order to get a proper separation of the germs. It will be seen that all fresh water (very light starch liquor or starch milk, so-called, might be used) enters the separator system through pipe 7 and passes to separator C from reel I through pipe 21. Since fresh water entering at pipe 7 is the only water entering the separator system, it is obvious that the control of gravity at separator C will be controlled by the amount of water entering through pipe 7. The amount of water which can be used from pipe 7 being limited, it is important that this water be used to the best advantage in reels I, J and K.

The material discharged from reel K after being ground in mill M, passes through pipe 23 to the first of a series of coarse reels, for example, N, O, P and Q, where it is subjected to a wet separation to remove the coarse bran and fibres from the starch. The tailings from reel Q pass by conveyor 24 to moisture expeller R and therefrom, as customary, to feed dryers (not shown). The material while passing through reels N, O, P and Q is washed by fresh water entering reel Q through pipe 25 then passing in succession to reels P, O and N by pipes 26, 27 and 28, respectively. By this means the starch liquor leaving reel N through pipe 29 contains practically all the starch and fine fibre from the material leaving mill M. This constitutes a counter-current washing operation. Starch liquor from pipe 29 containing the fine fibres is delivered to the first of a series of fine reels, for example, S, T, U and V, the tailings from V passing by conveyor 30 to filter press W to remove surplus water and being then delivered, as customary, to feed dryers (not shown). Fresh water enters reel V through pipe 31 and washes the fine fibres therein, thence passing to reels U and T in succession by pipes 32 and 33, respectively, constituting a counter-current washing system. As hereinabove described, the relatively light starch liquor from reel T passes by pipe 34 to breaker X, under filter press L where it dilutes the starch cake discharged from press L to a specific gravity suitable for tabling. This starch liquor mixes with the relatively heavy starch liquor discharged by reel S through pipe 35 and the mixture of the two constitutes starch liquor going to the tables.

The pipe 12 is provided with a branch pipe 36 for returning part of the liquor from the reels G and H to the germ separator in quantities variable by adjustment of valves 37 and 38.

It will be understood by those skilled in the art that shakers or other suitable separating devices might be used in place of the elements which have been referred to as reels. The term "conveyor" is used in the above description to mean any suitable means for moving the material from place to place. It will be understood that the connecting pipes will ordinarily be provided with valves to control the flow of liquid therethrough; also that suitable pumps are employed when necessary. In fact, the instrumentalities described for carrying out the operations referred to are not essential parts of my invention which considered as a method is not in any sense limited to the particular devices and apparatus shown and specified.

By subjecting the steeped corn to the treatment described, the yield of soluble substances is considerably increased. A large proportion of the soluble substances remaining in the corn after the steep water has been drained therefrom will be found in the filtrate pressed from the starch liquor in filter press L. These solubles are returned to the steep tank A so that the liquor drained from the steep tank, after each steeping operation, will have a higher degree of concentration or a larger volume of liquor can be drawn off at the same concentration than customary heretofore, that is to say, a larger percentage of the solubles of the grain will be eventually saved (by evaporation of the steep liquor, for example, as is customary) than is the case where fresh water (acidulated of course) is used for steeping, as has been the practice heretofore. Furthermore, the separation of water by filter press L and withdrawal of the same from the system at this point through pipe 14 permits an equal additional volume of water to be used, per bushel of corn, in the subsequent washing operation taking place in reels N, O, P, Q, S, T, U and V, and hence a more thorough separation of the starch from the fibre constituents of the grain. The amount of water introduced into the process through pipes 25 and 31 will be determined by the specific gravity of the starch liquor going to the tables, which, as a matter of practice, should not be varied to any considerable extent. As the starch which goes to the starch tables is relatively free from soluble substances it will ordinarily not be necessary, in order to obtain a refined starch from the tables, to re-table or wash on filters as heretofore has been frequently necessary, or if the practice of re-tabling or washing on filters be continued in connection with the process of my invention, a better grade of starch will be obtained than is possible by present practice.

I claim:

1. In the process of manufacturing starch from corn which comprises disintegrating the corn and making a separation in water of the starch therein from the nonstarch constituents, an improvement consisting in withdrawing from the disintegrated corn subjected to the aforesaid separation the bulk of the water employed in making such separation together with substantially all the residual solubles of the corn in solution therewith.

2. In the process of manufacturing starch from corn which comprises disintegrating the corn and making a separation in water of the starch therein from the nonstarch constituents, an improvement consisting in withdrawing from the disintegrated corn when said separation is partially performed the bulk of the water employed in making said separation, together with substantially all the residual solubles of the corn in solution therewith, and thereafter adding water to the material to complete said separation.

3. In the process of manufacturing starch from corn which comprises disintegrating the corn and making a separation in water of the starch therein from the nonstarch constituents, an improvement consisting in first separating from the disintegrated corn under treatment a starch liquor containing the bulk of the water used, residual solubles of the corn and starch, then filtering this starch liquor to remove the starch and withdrawing the filtrate, containing substantially all the residual solubles of the corn, from the separating operation.

4. In the process of manufacturing starch from corn which comprises disintegrating the corn and making a separation in water of the starch therein from the nonstarch constituents, an improvement consisting in removing from the disintegrated corn when said separation is partially performed, a starch liquor containing the bulk of the water used, residual solubles of the corn and starch, filtering this starch liquor to remove the starch and withdrawing the filtrate with substantially all the residual solubles of the corn from the separating operation, then adding water to the remaining unseparated starch bearing materials, and effecting the separation of the starch therefrom.

5. In the process of manufacturing starch from corn which comprises cracking the corn, separating the germ from the starch bearing constituent, grinding the latter and separating the bran from the starch, an improvement consisting in washing the germ and said starch bearing constituent separately, withdrawing from the material thus treated the starch milk resulting from said washings with substantially all the residual solubles of the corn therein and filtering this starch liquor to separate the starch therefrom.

6. In the process of manufacturing starch from corn which comprises cracking the corn, separating the germ from the starch bearing constituent, grinding the latter and separating the bran from the starch, an improvement consisting in washing the germ and said starch bearing constituent separately, withdrawing from the material thus treated the starch milk resulting from said washings with substantially all the residual solubles of the corn therein and filtering this starch liquor to separate the starch therefrom, and adding water to the ground starch bearing material to compensate for the water withdrawn as aforesaid.

7. In the process of manufacturing starch from corn which comprises steeping the corn, then disintegrating it and making a separation in water of the starch therein from the other constituents thereof, an improvement consisting in removing from the disintegrated corn as a part of said separating operation substantially all of the solubles remaining in the corn after the steeping operation.

8. In the process of manufacturing starch from corn which comprises steeping the corn, then disintegrating it and making a separation in water of the starch therein from the other constituents thereof, an improvement consisting in removing from the disintegrated corn subjected to the aforesaid separation the bulk of the water used in said separation, with residual solubles of the corn in solution therewith, and for said steeping operation utilizing the water withdrawn from a previous separating operation as just described.

9. In the process of manufacturing starch from corn which comprises steeping the corn, then disintegrating it and making a separation in water of the starch therein from the other constituents thereof, an improvement consisting in removing from the material subjected to the aforesaid separation a starch liquor containing the bulk of the water used in said separation, starch and residual solubles of the corn, filtering this starch liquor to remove the starch therefrom and for said steeping operation utilizing the filtrate obtained from a previous separating operation as just described.

10. In the process of manufacturing starch from corn which comprises steeping the corn, then disintegrating it and making a separation in water of the starch therein from the other constituents thereof, an improvement consisting in removing from the disintegrated corn when said separation is partially performed the bulk of the water used with residual solubles of the corn in solution therewith, and for said steeping operation utilizing the liquid withdrawn from a previous separating operation, as just described, adding water to the residue of the starch bearing material undergoing separation, and completing the separation of the starch therefrom.

11. In the process of manufacturing starch from corn which comprises steeping the corn, then disintegrating it and making a separation in water of the starch therein from the other constituents thereof, an improvement consisting in removing from the disintegrated corn when said separation is partially performed a starch liquor containing the bulk of the water used, starch and residual solubles of the corn, filtering the starch liquor to remove the starch therefrom and for said steeping operation utilizing the filtrate thus obtained from a previous separating operation as just described, adding water to the residue of the starch bearing material, and completing the separation of the starch therefrom.

12. Improved method of manufacturing starch from corn which comprises steeping the grain, cracking the steeped grain, separating the germs from the starch bearing material by flotation in starch liquor, washing the germs and the starch bearing material separately, filtering the surplus starch liquor obtained from the germ separator and said washing operations and utilizing the filtrate thus obtained for the steeping of subsequently treated grain.

13. Improved method of manufacturing starch from corn which comprises steeping the grain, cracking the steeped grain, separating the germs from the starch bearing material by flotation in starch liquor, washing the germs and the starch bearing material separately in a series of washing stages in which washing liquid is supplied to the material at the last stage and in which the liquor withdrawn from the several stages including the germ separation is used in precedent stages, filtering the surplus starch liquor from the germ separation and utilizing the filtrate thus obtained for the steeping of subsequently treated grain.

14. Improved method of manufacturing starch from corn which comprises steeping the grain, cracking the steeped grain, separating the germs from the starch bearing material by flotation in starch liquor, washing the germs and the starch bearing material separately in series of washing stages in which washing liquid is applied to the material at the last stage and in which the liquor withdrawn from the several stages including the germ separation is used in precedent stages, and filtering the surplus starch liquor from germ separation to remove starch therefrom.

15. Improved process of manufacturing starch from corn which comprises separating the germs from the starch bearing material, grinding the latter, separating with water the larger non-starch particles from the ground material in a series of successive stages in which washing liquid is supplied to the last stage and in which the liquor withdrawn from the several stages is utilized at precedent stages, subjecting the surplus starch liquor withdrawn from the germ separation to a filter pressing operation to separate the starch from the liquid and corn solubles, and subjecting the disintegrated corn to a second separation in water in which fresh water is added at the last stage and the liquor withdrawn from the several stages is utilized at precedent stages.

16. In the process of manufacturing starch from corn which comprises disintegrating the corn and making a separation in water of the starch therein from the non-starch constituents, an improvement consisting in eliminating from the disintegrated corn undergoing separation, while said separation proceeds, substantially all of the residual corn solubles which such material contains.

17. Improved process of manufacturing starch from corn which comprises disintegrating the corn, making a separation between the germ and the starch bearing material, withdrawing the bulk of the water from the starch bearing material together with substantially all of the residual solubles of the corn, and completing the separation of the starch from the disintegrated corn by the use of successive washings in water added to the material to compensate for that withdrawn.

18. Improved process of manufacturing starch from corn which consists in steeping the corn, disintegrating it, separating the germs, washing the starch bearing material, returning washings to the germ separator filtering the surplus starch liquor from the germ separation and removing the filtrate with substantially all the residual solubles of the corn, grinding the starch bearing material, adding fresh water to the starch bearing material, separating the residual starch from the starch bearing material and mixing the resultant starch liquor with the starch from the filtering operation.

19. Improved process of manufacturing starch from corn which consists in steeping the corn, disintegrating it, separating the germs, washing the starch bearing material, returning the resultant starch liquor to the germ separator, filtering the resultant starch liquor and removing the filtrate with substantially all the residual solubles of the corn, grinding the starch bearing material, adding fresh water to the starch bearing material, separating the starch from the starch bearing material, mixing the resultant residual starch liquor with the starch from the filtering operation, and utilizing the liquid obtained from the filtering operation for the subsequent steeping of grain.

ROBERT F. SHERMAN.

terial, withdrawing the bulk of the water from the starch bearing material together with substantially all of the residual solubles of the corn, and completing the separation of the starch from the disintegrated corn by the use of successive washings in water added to the material to compensate for that withdrawn.

18. Improved process of manufacturing starch from corn which consists in steeping the corn, disintegrating it, separating the germs, washing the starch bearing material, returning washings to the germ separator filtering the surplus starch liquor from the germ separation and removing the filtrate with substantially all the residual solubles of the corn, grinding the starch bearing material, adding fresh water to the starch bearing material, separating the residual starch from the starch bearing material and mixing the resultant starch liquor with the starch from the filtering operation.

19. Improved process of manufacturing starch from corn which consists in steeping the corn, disintegrating it, separating the germs, washing the starch bearing material, returning the resultant starch liquor to the germ separator, filtering the resultant starch liquor and removing the filtrate with substantially all the residual solubles of the corn, grinding the starch bearing material, adding fresh water to the starch bearing material, separating the starch from the starch bearing material, mixing the resultant residual starch liquor with the starch from the filtering operation, and utilizing the liquid obtained from the filtering operation for the subsequent steeping of grain.

ROBERT F. SHERMAN.

Certificate of Correction.

It is hereby certified that in Letters Patent No. 1,554,301, granted September 22, 1925, to Robert F. Sherman, of Pekin, Illinois, for an improvement in "The Manufacture of Starch," errors appear in the printed specification requiring correction as follows: Page 4, line 79, claim 13, strike out the words "including the germ separation" and insert the same to follow after the word "stages" in line 80; same page, line 94, claim 14, strike out the words "including the germ separation" and insert the same to follow after the word "stages" in line 95; page 5, line 35, claim 19, strike out the word "residual" and insert the same to follow after the article "the", line 33, same claim; and that the said Letters Patent should be read with these corrections therein that the same may conform to the record of the case in the Patent Office.

Signed and sealed this 15th day of December, A. D. 1925.

[SEAL.]

WM. A. KINNAN,
*Acting Commissioner of Patents.*

Certificate of Correction.

It is hereby certified that in Letters Patent No. 1,554,301, granted September 22, 1925, to Robert F. Sherman, of Pekin, Illinois, for an improvement in "The Manufacture of Starch," errors appear in the printed specification requiring correction as follows: Page 4, line 79, claim 13, strike out the words "including the germ separation" and insert the same to follow after the word "stages" in line 80; same page, line 94, claim 14, strike out the words "including the germ separation" and insert the same to follow after the word "stages" in line 95; page 5, line 35, claim 19, strike out the word "residual" and insert the same to follow after the article "the", line 33, same claim; and that the said Letters Patent should be read with these corrections therein that the same may conform to the record of the case in the Patent Office.

Signed and sealed this 15th day of December, A. D. 1925.

[SEAL.]

WM. A. KINNAN,
*Acting Commissioner of Patents.*